(12) United States Patent
Wiers et al.

(10) Patent No.: US 9,525,190 B2
(45) Date of Patent: Dec. 20, 2016

(54) SOLID LITHIUM ELECTROLYTE VIA ADDITION OF LITHIUM SALTS TO METAL-ORGANIC FRAMEWORKS

(71) Applicants: Brian M. Wiers, Berkeley, CA (US); Nitash P. Balsara, El Cerrito, CA (US); Jeffrey R. Long, Oakland, CA (US)

(72) Inventors: Brian M. Wiers, Berkeley, CA (US); Nitash P. Balsara, El Cerrito, CA (US); Jeffrey R. Long, Oakland, CA (US)

(73) Assignee: The Regents of The University of California, Oakland, CA (US)

(*) Notice: Subject to any disclaimer, the term of this patent is extended or adjusted under 35 U.S.C. 154(b) by 0 days.

(21) Appl. No.: 15/083,029

(22) Filed: Mar. 28, 2016

(65) Prior Publication Data

US 2016/0211545 A1    Jul. 21, 2016

Related U.S. Application Data

(62) Division of application No. 13/962,718, filed on Aug. 8, 2013, now Pat. No. 9,300,010.

(60) Provisional application No. 61/682,091, filed on Aug. 10, 2012.

(51) Int. Cl.
| | |
|---|---|
| H01M 6/18 | (2006.01) |
| H01M 10/056 | (2010.01) |
| H01M 10/0525 | (2010.01) |
| H01M 2/16 | (2006.01) |
| H01M 10/0562 | (2010.01) |

(52) U.S. Cl.
CPC ......... *H01M 10/056* (2013.01); *H01M 2/1653* (2013.01); *H01M 10/0525* (2013.01); *H01M 2/1646* (2013.01); *H01M 10/0562* (2013.01); *H01M 2300/0065* (2013.01)

(58) Field of Classification Search
CPC ............ H01M 10/056; H01M 10/0525; H01M 10/0562; H01M 2/1653; H01M 2/1646
See application file for complete search history.

(56) References Cited

PUBLICATIONS

Mulfort et al., "Post-Synthesis Alkoxide Formation Within Metal-Organic Framework Materials: A Strategy for Incorporating Highly Coordinatively Unsaturated Metal Ions", Published Feb. 26, 2009, American Chemical Society.*

(Continued)

*Primary Examiner* — Nicholas P D'Aniello
*Assistant Examiner* — Jimmy K Vo
(74) *Attorney, Agent, or Firm* — Lawrence Berkeley National Laboratory (57) ABSTRACT

Various embodiments of the invention disclose that the uptake of LiO$^i$Pr in Mg$_2$(dobdc) (dobdc$^{4-}$=1,4-dioxido-2,5-benzenedicarboxylate) followed by soaking in a typical electrolyte solution leads to a new solid lithium electrolyte Mg$_2$(dobdc)·0.35LiO$^i$Pr·0.25LiBF$_4$·EC·DEC. Two-point ac impedance data show a pressed pellet of this material to have a conductivity of 3.1×10$^{-4}$ S/cm at 300 K. In addition, the results from variable-temperature measurements reveal an activation energy of approximately 0.15 eV, while single-particle data suggest that intraparticle transport dominates conduction.

9 Claims, 12 Drawing Sheets

(56) References Cited

PUBLICATIONS

Mason et al., "Evaluating metal-organic frameworks for post-combustion carbon dioxide capture via temperature swing adsorption", Published Jul. 12, 2011, Energy and Environmental Science.*
Kamienski et al., "Relationship between Structure and Solubility of Organic Lithium Compounds", Published Mar. 3, 1965, The Journal of Organic Chemistry.*

* cited by examiner

SOLID LITHIUM ELECTROLYTE VIA ADDITION OF LITHIUM SALTS TO METAL-ORGANIC FRAMEWORKS

CROSS REFERENCE TO RELATED APPLICATIONS

This application is a Divisional of U.S. application Ser. No. 13/962,718 filed Aug. 8, 2013 and will issue as U.S. Pat. No. 9,300,010 on Mar. 29, 2016, which claims priority to U.S. Provisional Application Ser. No. 61/682,091 filed Aug. 10, 2012, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. Del.-AC02-05CH11231 between the U.S. Department of Energy and the Regents of the University of California for the management and operation of the Lawrence Berkeley National Laboratory. The government has certain rights in this invention.

BACKGROUND OF THE INVENTION

Field of the Invention

Electrolytes and lithium-ion batteries.

Brief Description of the Related Art

Due to their high energy density and operating potential, lithium-ion batteries have been widely adopted in portable electronics. However, to enable their implementation in traction applications, such as for electric vehicles, considerable improvements must still be made in terms of cost, energy and power density, manufacture, and safety. Advances in electrode chemistries as well as the separator are needed to meet those challenges. Currently, macroporous polymer membranes swelled with lithium salts dissolved in organic carbonates are utilized as the separator in lithium-ion batteries. The use of a liquid electrolyte restricts battery shape and processing, while also posing numerous safety problems, due to the potential leakage of corrosive liquids and the volatility and flammability of the electrolyte solvent.

Furthermore, the lack of rigidity for current battery separators precludes the use of solid lithium as an anode, because repeated cycling leads to lithium dendrites that can pierce the separator and cause cell failure. In contrast, a rigid, solid separator could inhibit lithium dendrite growth and allow the use of metallic lithium as an anode. Given the high theoretical capacity of lithium metal (3860 Ah/kg), and it's very negative reduction potential (−3.04 V vs. SHE), such an advance would enable tremendous gains in energy capacity.

Since the 1970s, salts dissolved in solid polyethers have been investigated as solid electrolyte materials. However, the low conductivities of such materials at room temperature ($10^{-6}$ S/cm) currently prevent their use in battery applications. Other solid lithium electrolytes either display total conductivities that are also too low or are poorly compatible with the battery electrodes.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Metal-organic frameworks are a broad class of microporous solids that have been investigated primarily for their gas adsorption properties, as well as for possible applications in sensing, drug delivery, catalysis, and optoelectronics. Recently, studies of electronic and proton conductivity have also been reported. While the intercalation of lithium ions into such materials has been observed, and porous zeolites have been investigated as fillers in solid polymer lithium electrolyte systems, as well as stand-alone solid electrolytes operating at high temperatures (>300° C.), there are no reports to date of the use of metal-organic frameworks as a lithium electrolyte for possible battery separator applications.

Figure 1:
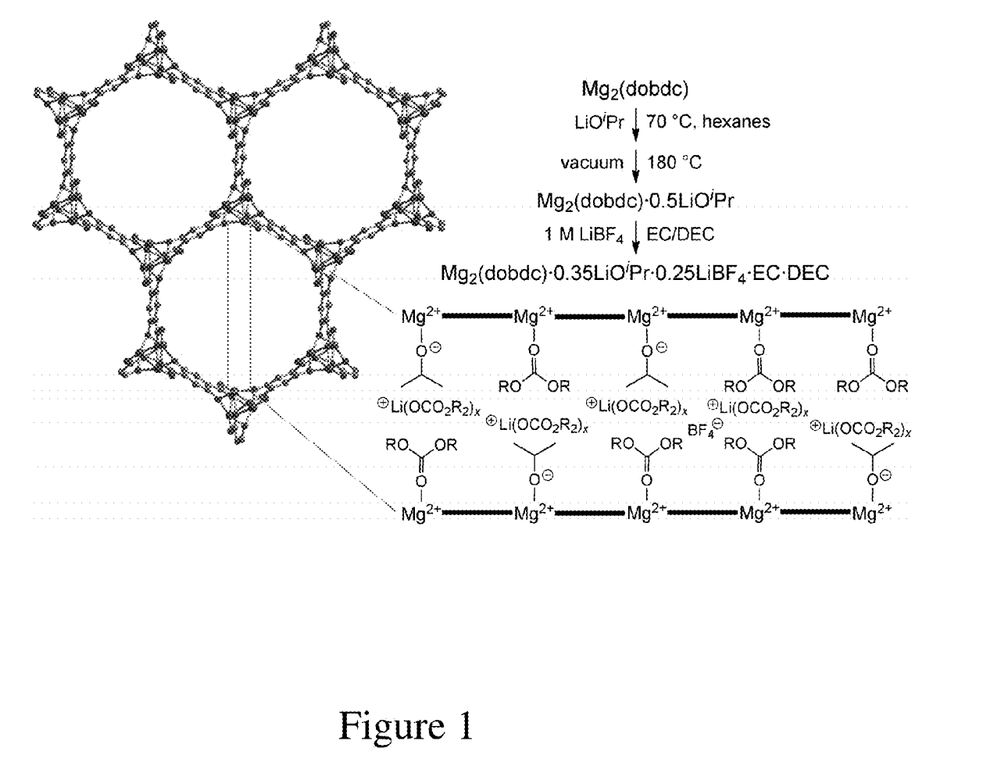
FIG. 1 illustrates the structure of $Mg_2$(dobdc) according to an embodiment of the invention.

Referring to FIG. 1, various embodiments of the invention disclose that the incorporation of lithium isopropoxide (LiO$^i$Pr) into a metal-organic framework Mg$_2$(dobdc) (wherein dobdc$^{4-}$=1,4-dioxido-2,5-benzenedicarboxylate) with open metal cation sites (Mg$^{2+}$ cation sites) can produce a solid with an ionic conductivity of greater than 10$^{-4}$ S/cm at 300 K.

Figure 4:
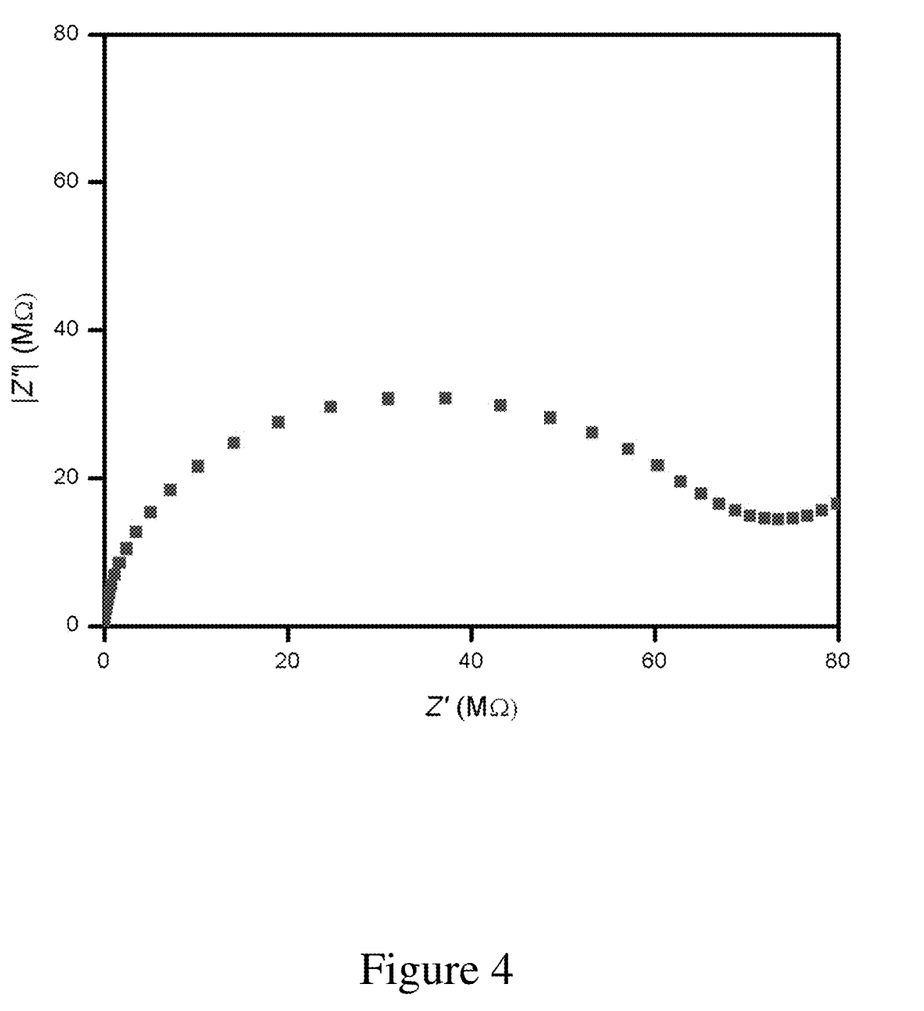
FIG. 4 illustrates a Nyquist plot of CuBTTri soaked in a 1M $LiBF_4$ in 1:1 (v:v) ethylene carbonate: diethyl carbonate mixture according to an embodiment of the invention.

In our evaluation of metal-organic frameworks as lithium electrolyte materials, we tested the ionic conductivity attained upon uptake of a common electrolyte solution within (Zn$_4$O)(btb)$_2$ (wherein btb$^{3-}$=benzenetrisbenzoate), H$_3$[(Cu$_4$Cl)$_3$(BTTri)$_8$] (wherein BTTri$^{3-}$=benzenetristriazolate) and Mg$_2$(dobdc). Each compound was soaked in a 1 M solution of lithium tetrafluoroborate (LiBF$_4$) in a 1:1 mixture of ethylene carbonate (EC) and diethyl carbonate (DEC), and the resulting materials were dried and pressed into pellets. The pellets were then placed in a thermostatted press and their conductivities were measured via two-point ac impedance spectroscopy. A Solartron 1260 frequency response analyzer connected to a Solartron 1296 dielectric interface and blocking stainless steel electrodes were employed for this process. The conductivity of each material was obtained by measuring the real impedance of the semicircles of the Nyquist plots, and taking the geometry of the pellets into account. The impregnated frameworks showed conductivities on the order of 10$^{-9}$ to 10$^{-6}$ S/cm (see FIG. 4). The most promising metal-organic framework is Mg$_2$(dobdc), which upon uptake of the electrolyte solution afforded a room temperature conductivity of 1.8×10$^{-6}$ S/cm. Although the most conductive of the materials we measured, this value still lies three orders of magnitude below what is desired for a battery electrolyte (10$^{-3}$ S/cm at ambient temperature)[4] and two orders of magnitude below what is considered the technological limit for a functional battery electrolyte (10$^{-4}$ S/cm). Researchers have previously effected post-synthetic modifications of metal-organic frameworks via covalent modification of organic ligands, as well as through the grafting of neutral ligands onto open metal centers.

The structure of Mg$_2$(dobdc) consists of one-dimensional hexagonal channels approximately 14 Å in diameter, and lined with coordinatively-unsaturated Mg$^{2+}$ cation sites (see FIG. 1). An embodiment of the invention demonstrates that the presence of these sites facilitates the uptake of a lithium alkoxide, leading to higher ionic conductivity. Here, the alkoxide anions preferentially binds the Mg$^{2+}$ ions of the framework, pinning them in place, while leaving the Li$^+$ cations relatively free to move along the channels. Moreover, variation of the alkyl group allows screening of the negative charge of the oxygen atom and modification of the pore content. Indeed, preliminary measurements showed grafting of Li$^i$OPr to give higher conductivities than grafting of either lithium methoxide (LiOMe) or lithium ethoxide (LiOEt).

Figure 5:
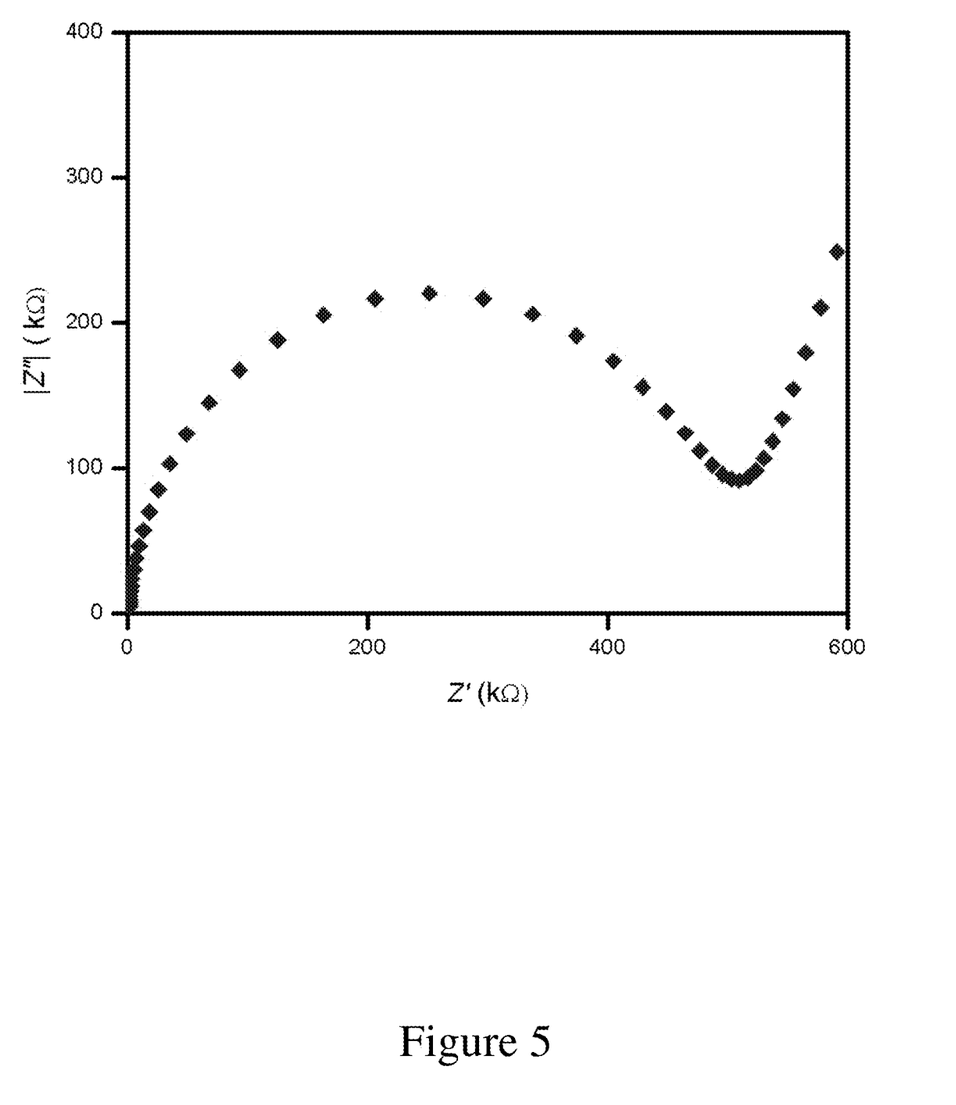
FIG. 5 illustrates a Nyquist plot of MOF-177 soaked in a 1M $LiBF_4$ in 1:1 (v:v) ethylene carbonate: diethyl carbonate mixture according to an embodiment of the invention.
Figure 6:
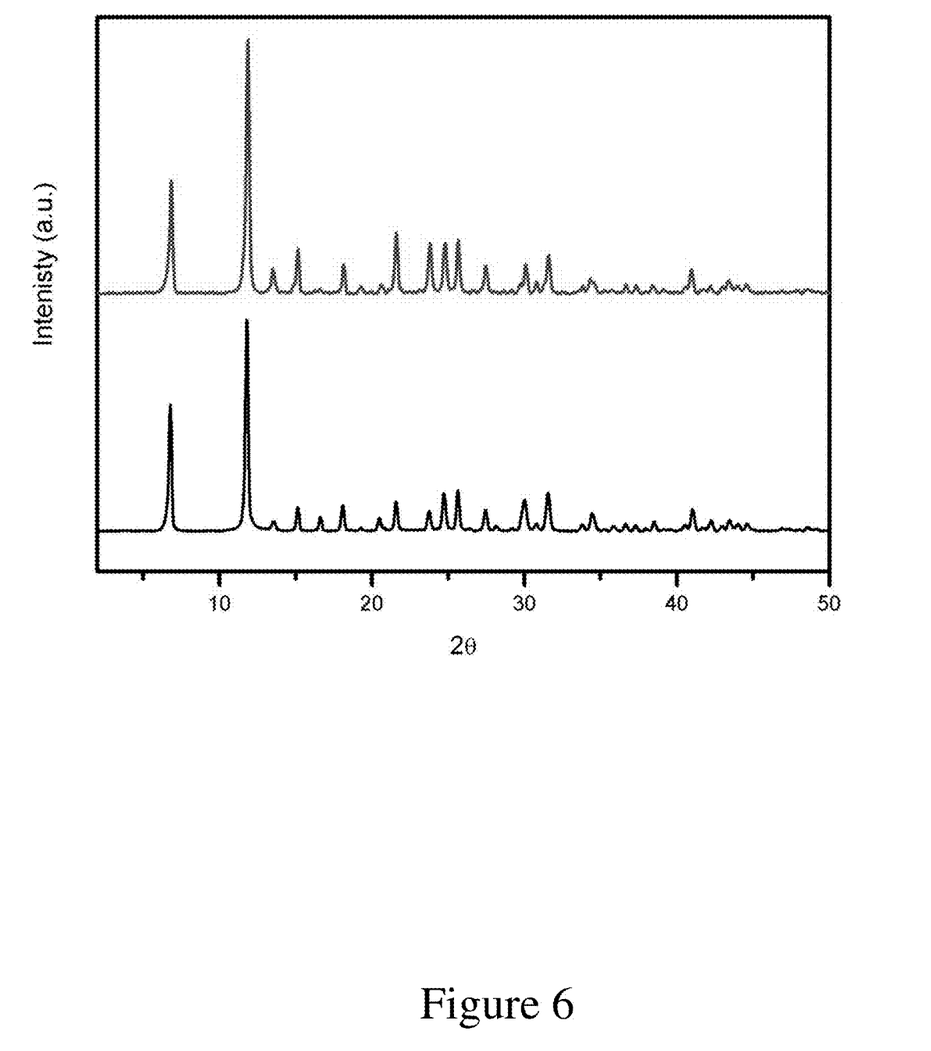
FIG. 6 illustrates Powder x-ray diffraction data for $Mg_2$(dobdc) as synthesized (bottom, black) and post-synthetically modified (top, red) according to an embodiment of the invention according to an embodiment of the invention.
Figure 7:
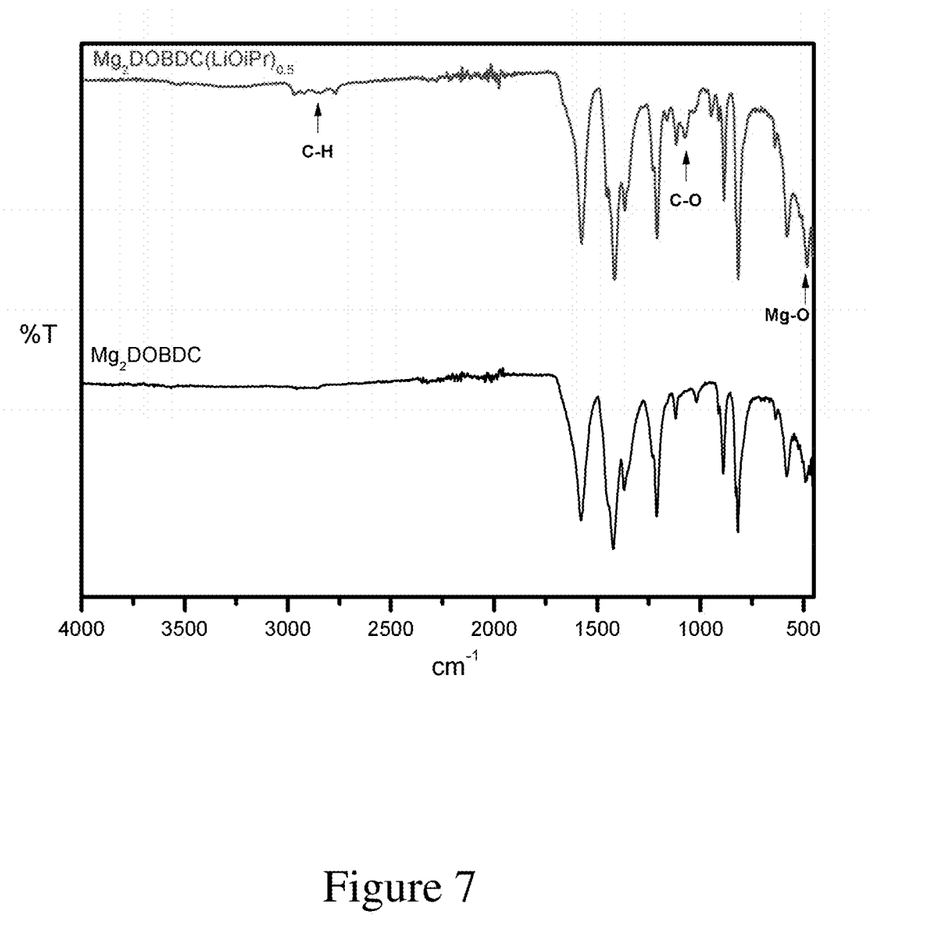
FIG. 7 illustrates FT-IR spectra of $Mg_2$(dobdc) before (bottom, black) and after (top, red) post-synthetic modification with lithium isopropoxide according to an embodiment of the invention.

To perform the grafting, Mg$_2$(dobdc) was activated by heating under vacuum to remove all solvent, followed by soaking for two weeks with a hot solution of the Li$^i$OPr in hexanes (see FIG. 1). The solids were then washed with hexanes and dried under reduced pressure. Infrared spectra of the resulting materials revealed the emergence of aliphatic C—H stretches at 3200 cm$^{-1}$, a new C—O stretch at 1080 cm$^{-1}$, and a broadening of what we assign to be an Mg—) stretch at 450 cm$^{-1}$ (see FIG. 5). The results from elemental analyses are consistent with the formula Mg$_2$(dobdc).0.5LiO$^i$Pr. Subsequent soaking of the material in a 1 M solution of LiBF$_4$ in a 1:1 mixture of EC and DEC, resulted in uptake of 0.25 equiv of lithium tetrafluoroborate (LiBF$_4$) and 2 equiv of carbonate solvent (either EC or DEC) to give a compound of formula Mg$_2$(dobdc).0.35LiO$^i$Pr.0.25LiBF$_4$.EC.DEC. The decrease in LiO$^i$Pr content may be due to leaching of unbound lithium alkoxide and/or exchange with LiBF$_4$. It should be noted that in concentrated solutions Li$^+$ cations can be solvated by as few as two carbonate molecules.[22] Powder x-ray diffraction data for this material indicate that the framework structure is preserved throughout the impregnation process (see FIG. 6). Thus, within the pores of the framework, we find a high density of charge carriers in close proximity to each other, allowing Li$^+$ cations to hop from site to site whilst remaining solvated by the carbonate molecules. The final sample was obtained as a dry, free-flowing powder that could be readily pressed into pellets.

Figure 2:
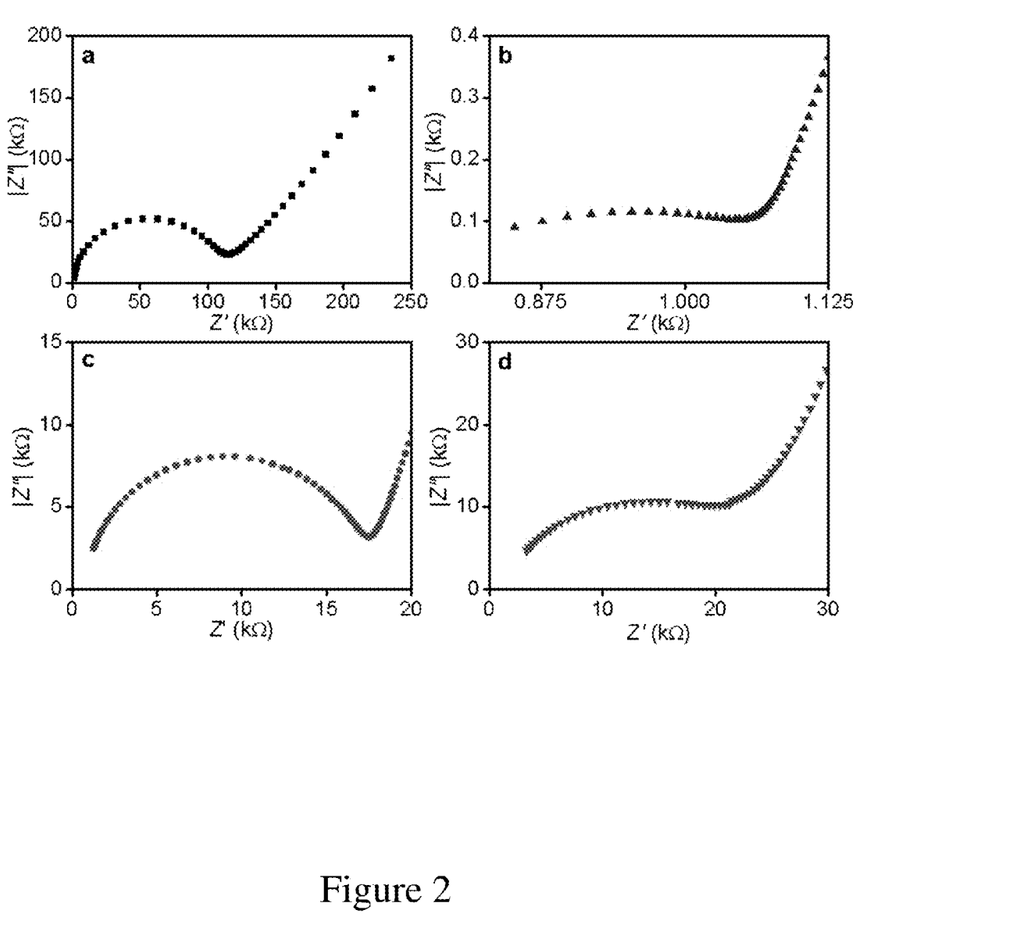
FIG. 2 depicts room-temperature conductivity measurements performed on pellets of this material according to an embodiment of the invention.

Measurements performed on pellets of this material from multiple preparations afforded room-temperature conductivities falling in the range 0.9-4.4×10$^{-4}$ S/cm (see FIG. 2). These values are two orders of magnitude greater than the 1.8×10$^{-6}$ S/cm measured for a pellet of Mg$_2$(dobdc).0.05LiBF$_4$.xEC/DEC, as obtained by simply soaking Mg$_2$(dobdc) in a LiBF$_4$ electrolyte solution. Evaluation of the molar conductivities for these two materials shows that, in addition to increasing lithium electrolyte content by a factor of 6.8, the grafting increases molar conductivity by a factor of 25, leading to the 170-fold increase in conductivity (see Table 1). Note that it is not possible to resolve grain vs. grain boundary conduction within a pellet by examination of the Nyquist plots, since only one semicircle is observed in each data set. However, the data do not form complete, regular semicircles, indicating the presence of inhomogeneities in the conduction pathway and therefore possible multiple conduction mechanisms, albeit with similar time constants.[24]

TABLE 1

Conductivity, Molar Li$^+$ Concentration, Molar Conductivity, and Activation Energy for Pellets of Mg$_2$(dobdc) with Various Electrolyte Loadings

| electrolyte loading | σ (S/cm) | $c_{Li}^+$ (M) | $\Lambda_M$ (S · cm$^{-1}$M$^{-1}$) | $E_a$ (eV) |
|---|---|---|---|---|
| 0.05LiBF$_4$ | 1.8 × 10$^{-6}$ | 0.19 | 9.6 × 10$^{-6}$ | 0.31 |
| 0.06LiO$^i$Pr | 1.2 × 10$^{-5}$ | 0.23 | 5.2 × 10$^{-5}$ | 0.14 |
| 0.35LiO$^i$Pr + 0.25LiBF$_4$ | 3.1 × 10$^{-4}$ | 1.3 | 2.4 × 10$^{-4}$ | 0.15 |

Figure 3:
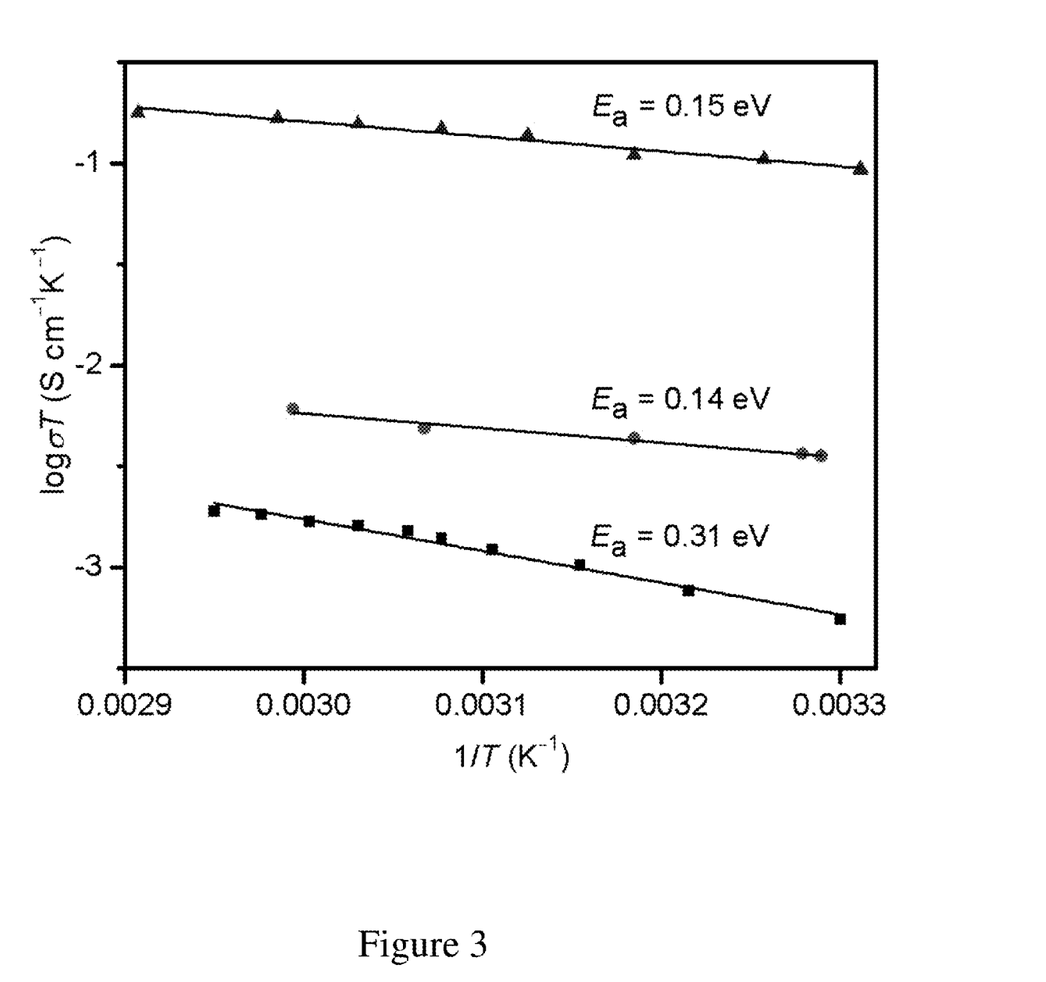
FIG. 3 illustrates Arrhenius-type activated behavior depicted as activation energy versus temperature according to an embodiment of the invention.

Varying the temperature of the pellets during the measurements revealed Arrhenius-type activated behavior (see FIG. 3). The data indicate a low activation barrier of 0.15 eV for conduction in the grafted material. In contrast, a much higher activation energy of 0.31 eV is observed for the material incorporating just LiBF$_4$, suggesting a fundamental difference in the conduction mechanism. As a solid electrolyte with 10$^{-4}$ S/cm conductivity and an activation energy of less than 0.4 eV, the new isopropoxide-grafted material can be classified as a superionic conductor.[23]

To probe the role of LiBF$_4$ in the conductivity of the new electrolyte, we prepared pellets of a sample of Mg$_2$(dobdc) incorporating LiO$^i$Pr and the EC/DEC solvent, but with no LiBF$_4$ added. Variation of the grafting conditions enabled preparation of Mg$_2$(dobdc).0.06LiO$^i$Pr.xEC/DC, for which the Li$^+$ concentration is approximately the same as in Mg$_2$(dobdc).0.05LiBF$_4$.xEC/DEC. For pellets of the new isopropoxide grafted sample, a typical conductivity of 1.2×10$^{-5}$ S/cm was obtained (FIG. 2c); however, considerable variation was observed here, with results sometimes being as low as $10^{-7}$ S/cm. We speculate that without the presence of additional LiBF$_4$ on the surfaces of the metal-organic framework crystallites, it may be difficult to obtain good interparticle conductivity, as well as reproducible interfacial contacts between the pressed pellet and the electrodes. This observation is consistent with other reports on the measurement of conductivities of solid electrolytes.[25] Importantly, despite the lower conductivity values, the activation energy of 0.14 eV for this sample is similar to that obtained for Mg$_2$(dobdc).0.35LiO$^i$Pr.0.25LiBF$_4$.EC.DEC.

Figure 8:
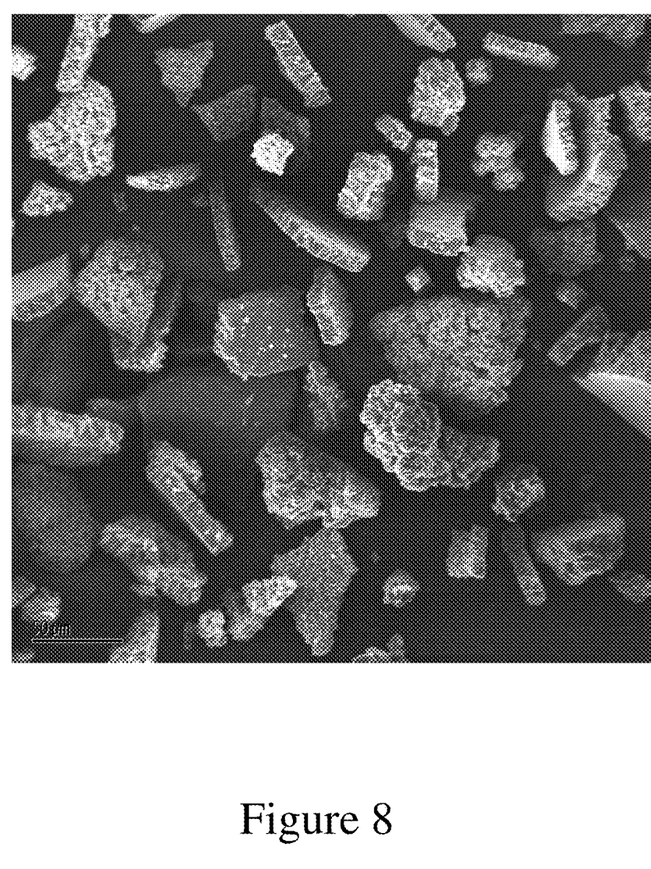
FIG. 8 illustrates plate-like morphology of as-synthesized $Mg_2$(dobdc) according to an embodiment of the invention.
Figure 9:
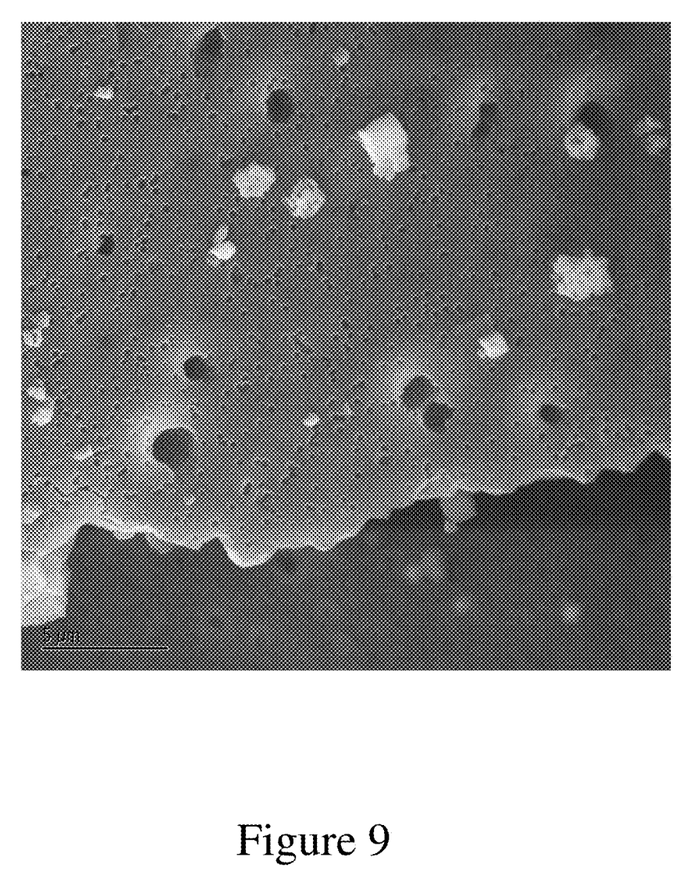
FIG. 9 illustrates a view of the $Mg_2$(dobdc) plate surface that grew on the borosilicate surface according to an embodiment of the invention.
Figure 10:
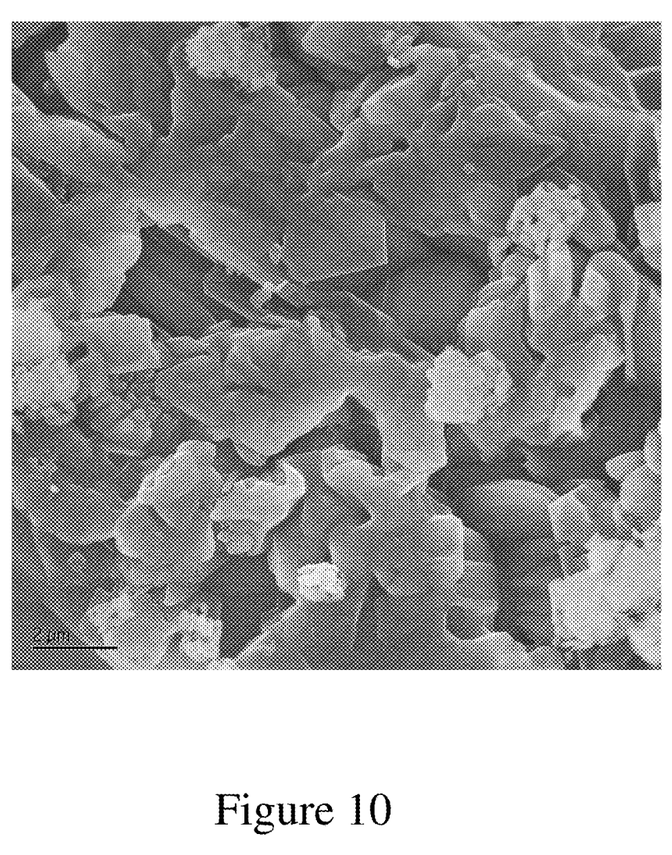
FIG. 10 illustrates a view of the $Mg_2$(dobdc) plate surface opposite the borosilicate glass according to an embodiment of the invention.
Figure 11:
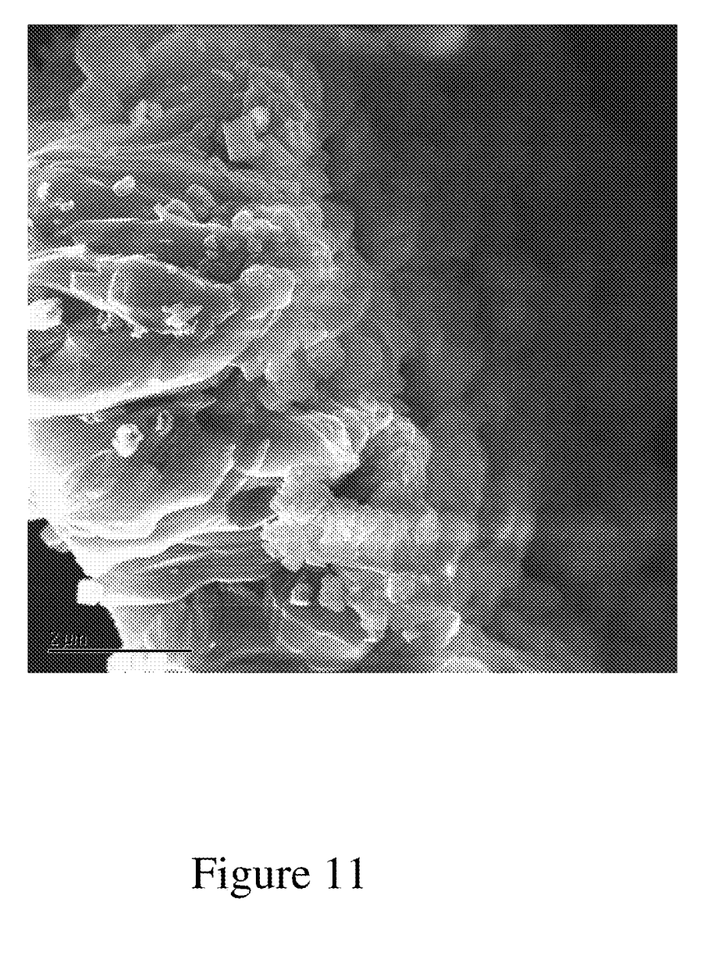
FIG. 11 illustrates a close-up view of $Mg_2$(dobdc) showing platelet edge and surface opposite the glass surface side according to an embodiment of the invention.
Figure 12:
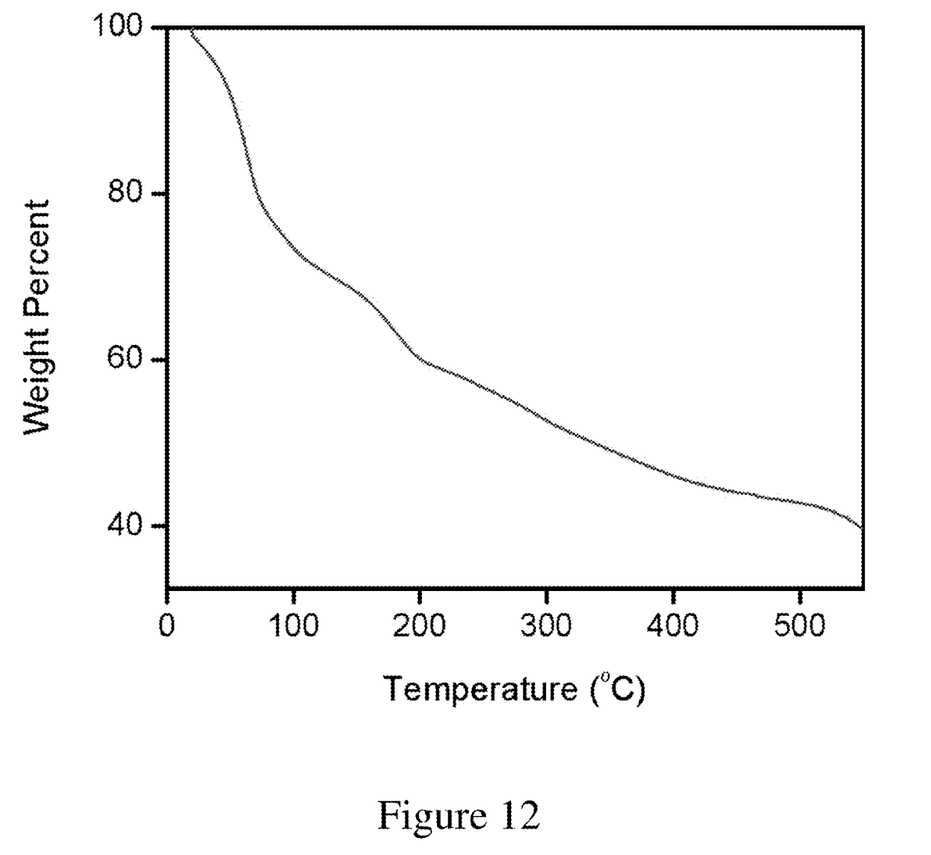
FIG. 12 illustrates a Thermogravimetric analysis data for the new lithium electrolyte material under flowing $N_2$ according to an embodiment of the invention.

While the impedance measurements were unable to distinguish intra- vs. interparticle conduction, a peculiarity of Mg$_2$(dobdc) crystallite growth provided a means of probing intraparticle conductivity. The compound can be formed as polycrystalline solid thin films in which the channel axes, along which ionic transport would be expected, are oriented normal to the film.[26] Indeed, SEM imaging showed our preparations to afford material mainly of this form (see FIG. 8), as grown on the surface of the boro silicate glass vials. A free-standing sheet of one of these films with the dimensions 1 mm×2 mm×0.4 mm was isolated and subjected to the same grafting and lithium electrolyte soaking treatment as used in preparation of the bulk solid electrolyte. AC impedance measurements performed directly on the film revealed a conductivity of 5.5×10$^{-5}$ S/cm (see FIG. 2d), which is of the same order of magnitude as obtained for pressed pellets of the bulk material. This result suggests that intraparticle processes rather than boundary processes dominate the conduction. It is possible that alignment of the conduction channels in the polycrystalline particles may even help to increase conductivity, since studies of lithium conductivity in polymers with anisotropic domains have revealed strong alignment and orientation effects. The attainability of thin, oriented films could perhaps facilitate development of methods for processing the new solid electrolyte and integrating it within devices.

The foregoing results demonstrate a promising new approach for creating solid lithium electrolyte materials. Incorporation of a lithium alkoxide within a porous metal-organic framework with open metal centers, such as Mg$_2$(dobdc), can lead to pinning of the counteranions and high ionic conductivities at ambient temperatures. The resulting conductivity values of $10^{-4}$ S/cm are highly reproducible, and are at the technological limit for battery separator applications. Efforts are underway to elucidate the mechanisms of ionic conduction within the new electrolyte material, and to obtain Li$^+$ ion mobilities and transference numbers via dc polarization transference measurements and $^7$Li NMR diffusion measurements. In addition, the performance of this material upon cycling within a lithium battery cell will be evaluated.

General Considerations.

Unless otherwise specified all syntheses and sample manipulations were performed under the rigorous exclusion of air and moisture in either N$_2$ or Ar glove boxes. All reagents and solvents were commercially available and used without further purification. Infrared spectra were collected on a Perkin Elmer Spectrum FT-IR/FT-FIR spectrometer equipped with an attenuated total reflectance accessory (ATR). Powder X-ray diffraction data was collected using Cu Kα (λ=1.5406 Å) radiation on a Bruker D8 Advance diffractometer. Carbon, hydrogen, and nitrogen analyses were obtained from the Microanalytical Laboratory of the University of California, Berkeley. Mass spectra were obtained from the QB3/Chemistry Mass Spectrometry Facility at UC Berkeley. Metals and halogen analyses were performed by Galbraith Laboratories in Knoxville, Tenn.

SEM was performed at the University of California Robert D. Ogg Electron Microscope Lab on a Hitachi S-5000 SEM. TGAs were performed on TA Instruments TGA-Q500 under N$_2$ atmosphere at a heating rate of 0.5° C./min.

Synthesis and Activation of Mg$_2$(dobdc).

Solid portions of 0.666 g of H$_4$dobdc (3.36 mmol) and 2.730 g of Mg(NO$_3$)$_2$.6H$_2$O (10.6 mmol) were dissolved in a 15:1:1 (v:v:v) mixture of DMF, ethanol, and deionized water. The solution was distributed amongst 24 20-mL scintillation vials and capped with PTFE caps. The vials were heated at 120° C. for 12 h. The resulting solid was collected over a Büchner funnel, dried under vacuum for 12 h, and transferred into a glove box. The sample was then soaked in DMF at 100° C. for 6 8-h cycles and then soaked in anhydrous methanol for 6 8-h cycles. The sample was then filtered and transferred into a Schlenk flask where it was evacuated at <10 mtorr for 12 h at 250° C.

Lithium Isopropoxide Grafting of Mg$_2$(dobdc) in Hexanes.

The activated framework was reacted with a 10-fold molar excess of 1.0 M lithium isopropoxide in hexanes in sealed vials at 80° C. for 2 weeks, after which the sample was collected by filtration and washed repeatedly with hexanes. The sample was then transferred to a Schlenk flash and evacuated on a vacuum line at <10 mtorr for 24 h at 180° C. Metals Analysis-Mg: 12.9%, Li: 0.970%. Molar ratio of Mg: Li—2:0.53. Elemental analysis—Calculated C, 41.45; H, 2.05. Found C, 40.61; H, 2.90.

Mg$_2$(dobdc).0.35LiO$^i$Pr.0.25LiBF$_4$.EC.DEC.

The material obtained as described above was soaked for 24 h in a 1 M LiBF$_4$ solution in a 1:1 (v:v) mixture of ethylenecarbonate (EC) and diethylcarbonate (DEC). Metals and halogen analysis (weight percent)—Mg: 9.10%, Li: 0.780%, B: 0.506%, F: 3.55%. Molar ratio of Mg:Li:B:F—2:0.6:0.25:1. Elemental analysis-Calculated (based on metals and halogen analysis) C, 39.19; H, 2.29. Found C, 37.72; H, 3.88. The obtained C, H, and N analyses poorly fit the formula calculated from the metals analysis. We believe this to be due to solvent desorption and possible uptake of other solvents in the glove box prior to analysis. Thermogravimetric analysis data of the material freshly removed from a sealed vial is consistent with the loss of one EC and one DEC molecule (45% weight loss).

Mg$_2$(dobdc).0.06LiO$^i$Pr.xEC.yDEC.

The activated framework was reacted with a 10-fold molar excess of 1.0 M lithium isopropoxide in tetrahydrofuran in sealed vials at 80° C. for 2 weeks, after which the sample was filtered and washed repeatedly with tetrahydrofuran. The sample was then transferred to a Schlenk flash and desolvated by heating on a vacuum line at 180° C. and <10 mtorr for 24 h. The material was then soaked for 24 h in a 1:1 (v:v) mixture of EC and DEC. Metals analysis (weight percent)—Mg:13.79%, Li 0.0723%. Molar ratio of Mg:Li—2:0.06.

Mg$_2$(dobdc).0.05LiBF$_4$.xEC.yDEC.

An activated sample of Mg$_2$(dobdc) was soaked for 24 h in a 1 M LiBF$_4$ solution in a 1:1 (v:v) ethylene carbonate: diethyl carbonate solution. Metals and halogen analysis (weight percent)—Mg:11.3%, Li: 0.082%, B: 0.069%, F: 0.858%. Molar ratio of Mg:Li:B:F—2-0.05:0.05:0.2.

Pellet Pressing.

Within an argon-filled glove box, the electrolyte material was placed in a Kapton washer and sandwiched between PTFE sheets. The pellet was then pressed at 5000 psi for 1 min.

Conductivity Measurements.

In an argon-filled glove box, ac impedance spectroscopy measurements were made using a homemade test cell on thermostatted pressed samples using a Solartron 1260 frequency response analyzer connected to a Solartron 1296 dielectric interface and blocking stainless steel electrodes. SMART (v1.1.1) software was used as control software. Measurements were made over a frequency range of 1 MHz to 1 Hz using a 100 mV (peak voltage) applied ac signal. Ten measurements were made in every frequency decade with 1 s integration times at each frequency. Variable temperature impedance spectra were collected over many temperatures using the thermostatted temperature control. Ionic conductivity σ(S/cm) was calculated as:

$$\sigma = L/(AR)$$

where L is the pellet thickness and A is the area in contact with the electrodes and R is the real impedance measured from the location of the local minima between the high and low frequency arcs measured on the real axis of a Nyquist plot. We found extrapolation of the high frequency arc to the real frequency intercept did not give conductivity values significantly different from the real resistance value measured at the local minima. We also found the values to not significantly differ when obtained by finding the plateau region of the Bode plot (log $|Z|$ vs. log f). For example the measured resistance of a pellet made of $Mg_2$(dobdc) $\cdot 0.35 LiO^iPr \cdot 0.25 LiBF_4 \cdot EC \cdot DEC$ was 2049Ω measuring by the local minima method, 2189Ω by modeling the high frequency curve as a polynomial and finding the real resistance axis intercept and by finding the plateau region of the Bode plot 2010Ω.

This invention has been described herein to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

Design, analysis, description of the materials used, properties of, and the synthesis of the Solid Lithium Electrolyte is described in the papers entitled *A Solid Lithium Electrolyte via Addition of Lithium Isopropoxide to a Metal-Organic Framework with Open Metal Sites* and supporting information of the same. These papers are incorporated herein by reference as if fully set forth in their entirety.

REFERENCES (1) (a) Nazri, G.-A.; Pistoia, G., Eds. *Lithium Batteries Science and Technology*, Kluwer Academic/Plenum, Boston, 2004. (b) Whittingham, M. S. *Chem. Rev.* 2004, 104, 4271.
(2) Arora, P; Zhang, Z. *Chem. Rev.* 2004, 104, 4419.
(3) Tarascon, J.-M.; Armand, M. *Nature* 2001, 414, 359.
(4) Xu, K. *Chem. Rev.* 2004, 104, 4303.
(5) Monroe, C.; Newman, J. *J. Electrochem. Soc.* 2005, 152, A396.
(6) (a) Wright, P. V. *J. Polym Sci., Phys. Ed.* 1976, 14, 955. (b) Armand, M. B.; Chabango, J. M.; Duclot, M. J. In *Fast Ion Transport in Solids*; Duclot M. J.; Vashishta, P.; Mundy, J. N.; Shenoy, G. K., Eds; North Holland: Amsterdam, 1979. (c) Ratner, M. A.; Shriver, D. F. *Chem. Rev.* 1988, 88, 109 and references therein. (d) Gadjourova, Z.; Andreev, Y.; Tunstall, D. P.; Bruce, P. G. *Nature* 2001, 412, 520.
(7) (a) Nagata, K. Nanno, T. *J. Power Sources* 2007, 174, 832. (b) Goodenough, J. B.; Kim, Y. *Chem. Mater.* 2010, 22, 587.
(8) (a) Eddaoudi, M.; Kim, J.; Rosi, N.; Vodak, D.; Wachter, J.; O'Keefe, M. Yaghi, O. M. *Science* 2002, 295, 469. (b) Matsuda, R.; Kitaura, R.; Kitagawa, S.; Kubota, Y.; Belosludov, R. V.; Kobayahi, T. C.; Sakamoto, H.; Chiba, T.; Takata, M.; Kawazoe, Y.; Mita, Y. *Nature* 2005, 436, 238. (c) Dincă, M.; Dailly, A.; Liu, Y.: Brown, C. M.; Neumann, D. A.; Long, J. R. *J. Am. Chem. Soc.* 2006, 128, 16876. (d) Sun, D.; Ma, S.; Ke, Y.; Collins, D. J.; Zhou, H.-C. *J. Am. Chem. Soc.* 2006, 128, 3896. (e) Kaye, S. S.; Dailly, A.; Yaghi, O. M.; Long, J. R. *J. Am. Chem. Soc.* 2007, 129, 14176.
(9) (a) Allendorf, M. D.; Houk, R. J. T.; Andruszkiewicz, L.; Talin, A. A.; Pikarsky, J.; Choudhury, A.; Gall, K. A.; Hesketh, P. J. *J. Am. Chem. Soc.* 2008, 130, 14404. (b) Lan, A.; Li, K.; Wu, H.; Olson, D. H.; Emge, T. J.; Ki, W.; Hong, M.; Li, J. *Angew. Chem. Int. Ed.* 2009, 48, 2334. (c) Lu, G.; Hupp, J. T. *J. Am. Chem. Soc.* 2010, 132, 7832.
(10) (a) Horcajada, P.; Serre, C.; Maurin, G.; Ramsahye, N. A.; Balas, F.; Vallet-Regí, M.; Sebban, M.; Taulelle, F.; Férey, G. *J. Am. Chem. Soc.* 2008, 130, 6774. (b) Rieter, W. J.; Pott, K. M.; Taylor, K. M. L.; Lin, W. *J. Am. Chem. Soc.* 2008, 130, 11584.
(11) (a) Seo, J. S.; Whang, D.; Le, H. Jun, S. I.; Oh, J.; Jeon, Y. J.; Kim, K. *Nature* 2000, 404, 982. (b) Wu, C.-D.; Hu, A.; Zhang, L.; Lin, W. *J. Am. Chem. Soc.* 2005, 127, 8940. (c) Cho, S.-H.; Ma, B.-Q.; Nguyen, S. T.; Hupp, J. T.; Albrecht-Schmitt, T. E. *Chem. Commun.* 2006, 2563. (d) Horike, S.; Dincá, M.; Tamaki, K.; Long, J. R. *J. Am. Chem. Soc.* 2008, 130, 5854. (e) Garibay, S.; Cohen, S. M. *Inorg. Chem.* 2010, 49, 8086.
(12) (a) Park, Y. K.; Choi, S. B.; Kim, H.; Kim, K.; Won, B. H.; Choi, K.; Choi, J. S.; Ahn, W. S.; Won, N.; Kim, S.; Jung, D. H.; Choi, S. H.; Kim, G. H.; Cha, S. S.; Jhon, Y. H.; Yang, J. K.; Kim, J. *Angew. Chem., Int. Ed.* 2007, 46, 8230. (b) White, K. A.; Chengelis, D. A.; Gogick, K. A.; Stehman, J.; Rosi, N. L., Petoud, S. *J. Am. Chem. Soc.* 2009, 131, 18096.
(13) (a) Takaishi, S.; Hosoda, M.; Kajiwara, T.; Miyasaka, H.; Yamashita, M.; Nakanishi, Y.; Kitagawa, Y.; Yamaguchi, K.; Kobayashi, A.; Kitagawa, H. *Inorg. Chem.* 2008, 48, 9048. (b) Kobayashi, Y.; Jacobs, B.; Allendorf, M. D.; Long, J. R. *Chem. Mater.* 2010, 22, 4120. (c) Okubo, T.; Tanaka, N.; Kim, H. K.; Anma, H.; Seki, S.; Saeki, A.; Maekawa, M.; Kuroda-Sowa, T. *Dalton Trans.*, 2011, 40, 2218.
(14) (a) Bureekaew, S. Horike, S.; Higuchi, M.; Mizuno, M.; Kawamura, T.; Tanka, D.; Yanai, N.; Kitagawa, S. *Nat. Mater.* 2009, 8, 831. (b) Hurd, J. A.; Vaidhyanathan, R.; Thangadurai, V.; Ratcliffe, C. I.; Moudrakovski, I. L.; Shimizu, G. K. H. *Nat. Chem.* 2009, 1, 705. (c) Shigematsu, A.; Yamada, T.; Kitagawa, H. *J. Am. Chem. Soc.* 2011, 133, 2034. (d) Sadakiyo, M.; Yamda, T.; Kitagawa, H. *J. Am. Chem. Soc.* 2009, 131, 9906.
(15) (a) Férey, G.; Millange, F.; Morcette, M.; Serre, C.; Doublet, M.-L.; Grenèche, J.-M.; Tarascon, J.-M. *Angew. Chem. Int. Ed.* 2007, 46, 3259. (b) de Combarieu, G.; Morcrette, M.; Millange, F.; Guillou N.; Cabana, J.; Grey, C. P.; Margiolaki, I.; Férey, G.; Tarascon J.-M. *Chem. Mater.* 2009, 21, 1602. (c) Mulfort, K. L.; Wilson, T. M.; Wasielewski, M. R.; Hupp, J. T. *Langmuir* 2009, 25, 503.
(16) (a) Vitadello, M. Suarez, S.; Chung, S. H.; Fujimoto, K.; Di Noto, V.; Greenbaum, S. G.; Furukawa, T. *Electrochim. Acta.* 2003, 48, 2227. (b) Xi, J.; Bal, Y.; Qiu, X.; Zhu, W.; Chen, L. Tang, X. *New J. Chem.* 2005, 29, 454.

(17) (a) Krogh Andersen, E.; Krogh Andersen, I. G.; Metcalf-Johansen, J.; Simonsen, K. E.; Skou, E. *Solid State Ionics* 1988, 28, 249. (b) Ben Saad, K.; Hamzaouhi, H.; Mohamed, M. M. *Mat. Sci Eng. B.* 2007, 139, 226.

(18) Chae, H. K.; Siberio-Pérez, D. Y.; Kim, J.; Go, Y.; Eddaoudi, M.; Matzger, A.; O'Keefe, M.; Yaghi, O. M. *Nature* 2004, 427, 523.

(19) Demessence, A.; D'Alessandro, D. M.; Foo, M. L.; Long, J. R. *J. Am. Chem. Soc.* 2009, 131, 8784.

(20) Caskey, S. R.; Wong-Foy, A. G.; Matzger, A. J. *J. Am. Chem. Soc.* 2008, 130, 10870.

(21) (a) Morris, W.; Doonan, C. J.; Furukawa, H.; Banerjee, R.; Yaghi, O. M. *J. Am. Chem. Soc.* 2008, 130, 12626. (b) Wang, Z., Tanabe, K. K., Cohen, S. M. *Inorg. Chem.* 2009, 48, 296. (c) Gadzikwa, T.; Farha, 0. K.; Malliakas, C. D.; Kanatzidis, M. G.; Hupp, J. T.; Nguyen, S. T. *J. Am. Chem. Soc.* 2009, 131, 13613.

(22) Jung, H. S.; Lee, J.-K.; Kim, J.-Y.; Hong, K. S. *J. Colloid Interface Sci.* 2003, 259, 127.

(23) (a) Cazzanelli, E.; Croce, F.; Appetecchi, G. B.; Benevelli, F.; Mustarelli, P. *J. Phys Chem.* 1997, 107, 5740. (b) Soetens, J.-C.; Millot, C.; Maigret, B. *J. Phys. Chem. A.* 1998, 102, 1055.

(24) Hasbach, A.; Retter, U.; Siegler, K.; Kautek, W. *J. Electronal. Chem.* 2004, 561, 29.

(25) (a) Chandra S. Superionic Solids North-Holland, Amsterdam, 1981. (b) Colomban, P.; Novak, A. *J. Molec. Struct.* 1988, 177, 277.

(26) Barpanda, P.; Chotard, J.-N.; Delacourt, C.; Reynaud, M.; Filinchuk, Y.; Armand, M.; Deschamps, M.; Tarascon, J.-M. *Angew. Chem. Int. Ed.* 2011, 50, 2526.

(27) Bétard, A.; Zacher, D.; Fischer, R. A. *CrystEngComm* 2010, 12, 3768. Singh, M.; Odusanya, O.; Wilmes, G. M.; Eitouni, H. B.; Gomez, E. D.; Patel, A. J.; Chen, V. L.; Park, M. J.; Fragoui, P.; Iatrou, H.; Hadjichristidis, N.; Cookson, D.; Balsara, N. P. *Macromolecules* 2007, 40, 4578. (b.)

We claim:

1. A method of forming a solid lithium electrolyte composition including a metal-organic framework comprises $Mg_2(dobdc)$, wherein dobdc=1,4-dioxido-2,5-benzenedicarboxylate and a lithium alkoxide comprising:
    dissolving solid portions of $H_4$dobdc and $Mg(NO_3)_2.H_2O$ in a mixture of DMF, ethanol and deionized water and heating the solution to produce a solid;
    soaking the resulting solid in DMF and then soaking in anhydrous methanol followed by filtering and evacuating the resultant solid to activate the metal-organic framework and form an activated framework;
    reacting the activated framework with lithium isopropoxide in hexanes and collecting the sample by filtration and washing repeatedly with hexanes followed by evacuation; and
    soaking the activated framework in a lithium tetrafluoroborate (LiBF4) solution including a mixture of ethylenecarbonate (EC) and diethylcarbonate (DEC).

2. The method of claim 1, wherein the lithium alkoxide comprises lithium isopropoxide ($LiO^iPr$).

3. The method of claim 1, wherein the lithium alkoxide comprises lithium ethoxide LiOEt).

4. The method of claim 1, wherein the lithium alkoxide comprises lithium methoxide (LiOMe).

5. The method of claim 1, wherein metal-organic framework comprises open metal cation $Mg^{2+}$ sites.

6. The method of claim 1, wherein metal-organic framework further comprises lithium tetrafluoroborate ($LiBF_4$).

7. The method of claim 1, wherein metal-organic framework further comprises ethylene carbonate (EC).

8. The method of claim 1, wherein metal-organic framework further comprises diethyl carbonate (DEC).

9. The method of claim 1, wherein the composition comprises $Mg_2(dobdc).0.35LiO^iPr.0.25LiBF_4.EC.DEC$.

* * * * *